US005894542A

United States Patent [19]

Kim

[11] Patent Number: 5,894,542

[45] Date of Patent: Apr. 13, 1999

[54] TECHNIQUE FOR USING ONE KEY FOR BOTH FORM FEED AND CARTRIDGE EXCHANGE

[75] Inventor: Moo-Deck Kim, Seoul, Rep. of Korea

[73] Assignee: SamSung Electronics Co., Ltd., Suwon, Rep. of Korea

[21] Appl. No.: 08/833,222

[22] Filed: Apr. 14, 1997

[30] Foreign Application Priority Data

Apr. 16, 1996 [KR] Rep. of Korea ........................ 96-11482

[51] Int. Cl.[6] ............................ G06K 15/16; B41J 29/393

[52] U.S. Cl. ................................ 395/111; 395/114; 347/5; 347/16; 347/19

[58] Field of Search .................................... 347/19, 5, 16, 347/2, 104; 395/111, 114, 112; 358/502, 442, 468, 296; 399/81

[56] References Cited

U.S. PATENT DOCUMENTS

| | | | |
|---|---|---|---|
| 4,327,994 | 5/1982 | Barley et al. | 399/81 |
| 4,614,421 | 9/1986 | Nishiyama | 399/81 |
| 5,311,257 | 5/1994 | Ishi et al. | 399/81 |
| 5,546,514 | 8/1996 | Nishiyama | 395/111 |
| 5,604,844 | 2/1997 | Nishiyama | 395/111 |

*Primary Examiner*—Scott Rogers
*Attorney, Agent, or Firm*—Robert E. Bushnell, Esq.,

[57] ABSTRACT

A technique for using one key for both form feed and cartridge exchange for inputting many kinds of commands related to the functions thereof in order to simplify a key input unit of an operating panel in a printer capable of being controlled by a host using a DOS operating system. The technique for using one key for both form feed and cartridge exchange in the ink-jet printer, includes: (a) receiving key data generated by operating a unitary cartridge exchange form feed key; (b) checking whether or not paper is located at the printing position of the ink-jet printer after receiving the key data; (c) ejecting the paper from the printing position upon a determination that paper is located therein in step (b); (d) moving the papers of a paper tray to earliest printing position upon a determination that paper is absent therein in step (b); (e) checking once again whether or not paper is located at the printing position of the ink-jet printer after moving paper in step (e); and (f) moving the cartridge to a position in which it can be easily detached and attached upon a determination that paper is absent therein in step (e).

4 Claims, 4 Drawing Sheets

TECHNIQUE FOR USING ONE KEY FOR BOTH FORM FEED AND CARTRIDGE EXCHANGE

This application makes reference to, incorporates the same herein, and claims all benefits accruing under 35 U.S.C.§119 from an application for METHOD FOR USING ONE KEY FOR BOTH FORM FEED AND CARTRIDGE EXCHANGE earlier filed in the Korean Industrial Property Office on 15 Apr. 1996 and there duly assigned Ser. No. 11482/1996.

BACKGROUND OF THE INVENTION

1. Field of the Invention

The present invention relates generally to an ink-jet printer, and more particularly, to a technique for processing the operation of a key of an operating panel thereof 2. Description of the Related Art In general, an ink-jet printer has an operating panel including many keys for inputting many kinds of commands. In an earlier operating panel, a key input unit is comprised of a power supply key for turning the power supply on and off, a cartridge exchange key for effecting a cartridge exchange, a form feed key for effecting a form feed, and other keys for other features. Thus, a user can input many kinds of commands to the ink-jet printer by operating the aforesaid keys of the key input unit.

On the other hand, a user can input the commands to the ink-jet printer through a host. The host, using a Windows operating system, for example, includes a printer control board. A user can input many kinds of commands to the ink-jet printer by clicking the printer control board using a mouse. Thus, typically, the inkjet printer (herein, it refers to a printer which is used with the Windows operating system, exclusively) is capable of just being controlled by the host which reduces the number of keys of the operating panel in order to simplify the key input unit thereof and to also lower the manufacturing cost.

Typically, the inkjet printer can be also controlled by a host using a DOS (Disk Operating System) operating system. The host using DOS does not include the printer control board which is different from the host using Windows. For that reason, a user can not input many kinds of commands to the ink-jet printer through the host using DOS. Further, it is a disadvantage in that the key input unit of the operating panel can not be simplified in the earlier ink-jet printer differently from the printer which is exclusively used with a host using Windows.

The following patents each disclose features in common with the present invention but do not teach or suggest the specifically recited technique for using one key for both form feed and cartridge exchange as in the present invention.

U.S. Pat. No. 5,604,844 to Nishiyama, entitled Printing Method And Apparatus, U.S. Pat. No. 5,546,514 to Nishiyama, entitled Printing Method And Apparatus, U.S. Pat. No. 5,311,257 to Ishii et aL, entitled Image Forming Apparatus, U.S. Pat. No. 4,614,421 to Nishiyama, entitled Duplicating-Sheet-Number Setting Device, and U.S. Pat. No. 4,327,994 to Barley et al., entitled Progressive Disclosure Copying Machine Console Using Common Keys For Copy Number And Function Select Operations.

SUMMARY OF THE INVENTION

Accordingly, it is an object of the present invention to provide a technique for using one key for both form feed and cartridge exchange by inputting many kinds of commands related to the form feed and the cartridge exchange in order to simplify a key input unit of an operating panel in a printer capable of being controlled by a host using a DOS operating system.

To achieve the above object, the present invention includes a method for using one key for both form feed and cartridge exchange in an ink-jet printer, including the steps of: (a) receiving key data generated by inputting a unitary cartridge exchange form feed key; (b) checking whether or not paper is located at the printing position of said ink-jet printer after receiving said key data; (c) ejecting paper from the printing position upon a determination that paper is located therein in step (b); (d) moving paper from a paper tray to an earliest printing position upon a determination that paper is absent therein in step (b); (e) checking once again whether or not paper is located at the printing position of said ink-jet printer after moving paper in step (d); and (f) moving said cartridge to a position in which it can be easily detached and attached upon a determination that paper is absent in step (e).

BRIEF DESCRIPTION OF THE DRAWINGS

These and various other features and advantages of the present invention will be readily understood with reference to the following detailed description taken in conjunction with the accompanying drawing, in which the same parts of elements of the drawings represent the like number or symbol wherever possible, wherein.

DETAILED DESCRIPTION OF THE PREFERRED EMBODIMENTS

Now, a preferred embodiment of the present invention will be discussed in detail with reference to the accompanying drawings. Throughout the drawings, it is noted that the same reference numbers or letters will be used to designate like or equivalent elements having the same function. Further, in the following description, numeral specific details are set forth to provide a more readily understanding of the present invention. It will be apparent, however, to one skilled in the art that the present invention may be practiced without these specific details. A detailed description of known functions and constructions unnecessarily obscuring the subject matter of the present invention has been avoided in the present application.

Figure 1:
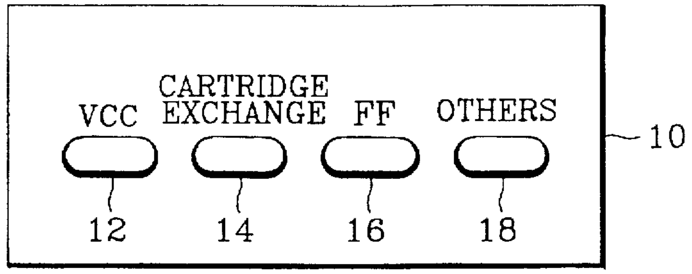
FIG. 1 shows a key input unit of an earlier operating panel.

FIG. 1 shows a key input unit 10 of an earlier operating panel. The key input 10 is comprised of a power supply key 12, a cartridge exchange key 14, a form feed key 16 and other keys 18.

Figure 2:
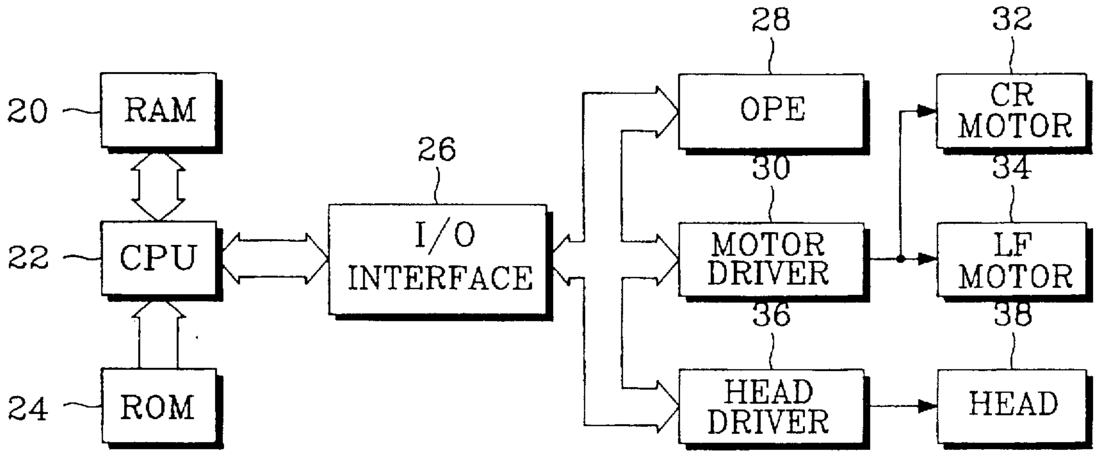
FIG. 2 is a block diagram illustrating an ink jet printer.

FIG. 2 is a block diagram illustrating an ink jet printer. A CPU 22 controls each unit of the ink-jet printer through an input/output interface 26 (hereinafter, it is denoted as I/O interface) according to a control program stored in a ROM (Read Only Memory) 24. The ROM 24 stores the control program of the CPU 22 and many kinds of initial data thereof A RAM(Random Access Memory) 20 stores data temporarily according to control of the CPU 22. The I/O interface 26 interfaces the signals inputted/outputted between the CPU 22 and input/output units such as the operating panel 28, a motor driver 30 and a head driver 36. The operating panel 28 includes a number of keys for inputting many kinds of commands and displays the state of the ink-jet printer under the control of the CPU 22.

The motor driver 30 drives a carriage motor 32 (hereinafter, it is referred to as a "CR motor") and a line feed motor 34 (hereinafter, it referred to as an "LF motor") under the control of the CPU 22. The CR motor 32 is driven by the motor driver 30 and moves a cartridge storing an ink and including a recording head 38. The LF motor 34 is driven by the motor driver 30 and moves the printing paper. The head driver 36 jets out the ink through a nozzle mounted on the head 38 under the control of the CPU 22, thereby forming an image on the printing paper. The recording head 38 includes a plurality of nozzles each forming an ejecting hole and driven by the head driver 36.

Figure 3:
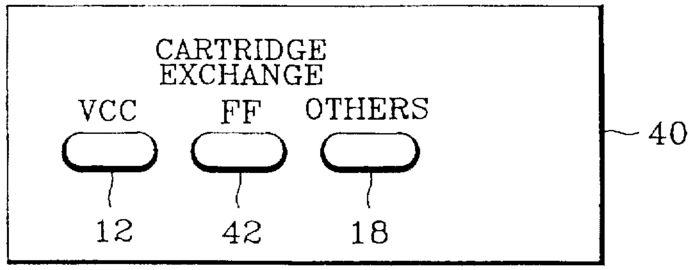
FIG. 3 shows a key input unit of an operating panel according to an embodiment of the present invention.

In the present invention, the command functions of form feed and cartridge exchange by using only a single key in the ink-jet printer. Therefore, as illustrated in FIG. 3, a key input unit 40 of the operating panel equipment 28 includes the power supply key 12, a cartridge exchange form feed key 42 and the keys 18 for the other functions according to an embodiment of the present invention. In other word, the key input unit 40 according to an embodiment of the present invention just includes the single cartridge exchange form feed key 42 which different from the earlier key input unit in which the form feed key 16 and the cartridge exchange key 14 are separate in the ink-jet printer.

Herein, the cartridge exchange function means that the cartridge is moved to a cartridge exchange position, so as to be easily exchanged by a user.

Further, the form feed includes two functions. One is that when the error indication "no 18 paper" is displayed, a user inserts paper in the ink-jet printer, and then the papers are moved to the earliest printing position, thereby resolving the error indication. The other function is that the inserted papers are ejected when the papers have already been inserted within the ink-jet printer.

Figure 4:
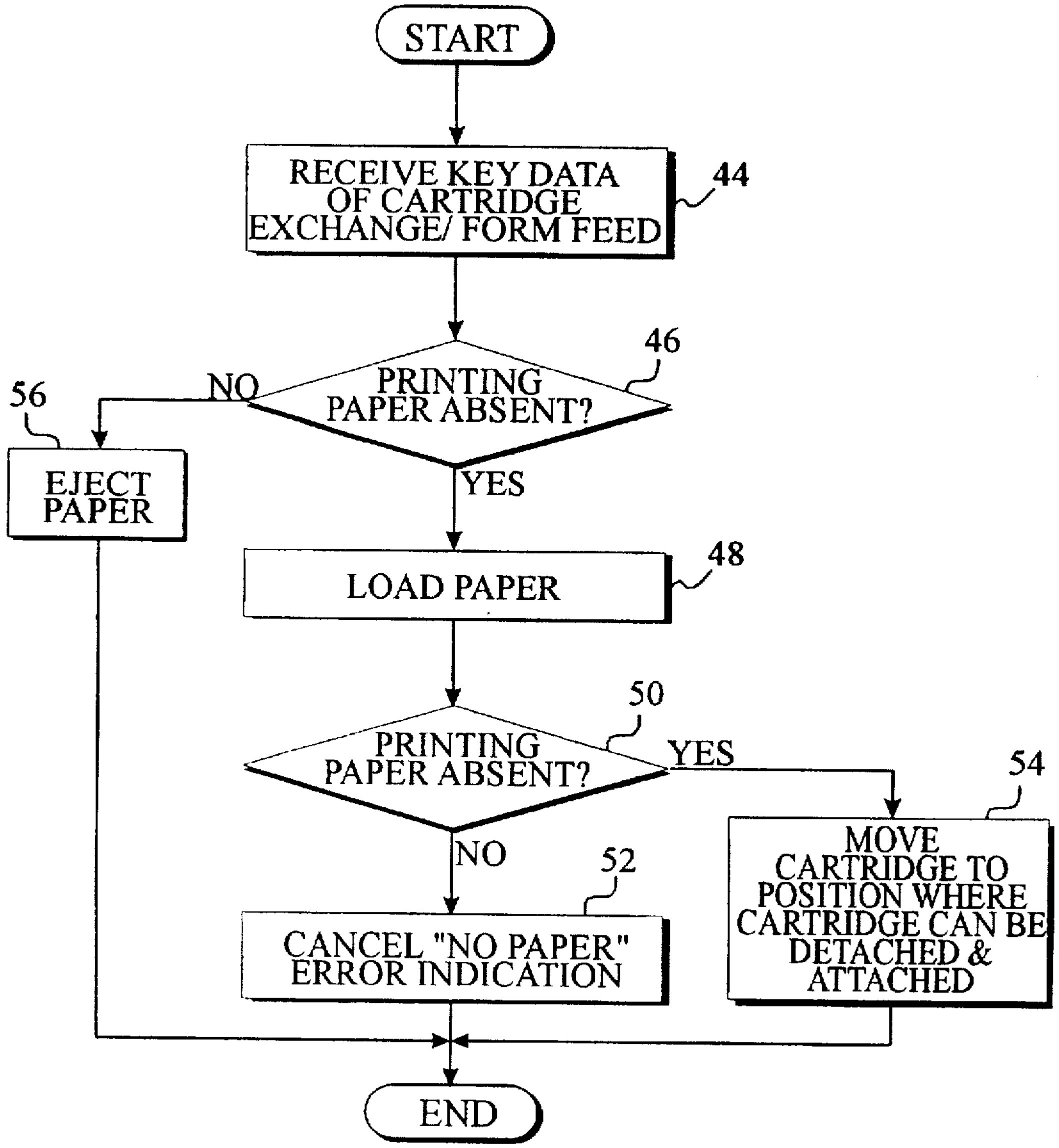
FIG. 4 is a flowchart illustrating a method for using one key for both form feed and cartridge exchange according to an embodiment of the present invention.

FIG. 4 is a flowchart illustrating a technique for using one key for both form feed and cartridge exchange. Hereinafter, the method thereof will be explained in detail with reference to FIGS. 2 to 4. When the cartridge exchange form feed key 42 is operated by a user, the CPU 22 performs the program according to the flowchart of FIG. 4. At step 44, the CPU 22 receives key data by the operation of the cartridge exchange form feed key 42. Herein, after receiving the key data the CPU 22 checks at step 46 whether or not printing paper is absent from the printing position of the ink-jet printer through a paper sensor at the time of the operation of the cartridge exchange form feed key 42 by the user. At this time, when it has been determined that paper was absent, the CPU 22 proceeds to step 48, where paper is loaded from a paper tray in the printer. However, when it has been determined that there was paper in the printing position, the CPU 22 proceeds to step 56, ejecting the paper already loaded in the printing position within the printer and then ending all its operations.

At the step 48, the CPU 22 loads paper from the paper tray to the earliest printing position by driving the LF motor 34. After loading the paper as stated above, the CPU 22 proceeds to step 50, thereby performing its operation. At the step 50, the CPU 22 determines whether or not paper is absent from the printing position of the ink-jet printer using the paper sensor. At this time, when it has been determined that paper is absent from the printing position, the CPU proceeds to step 54, thereby performing its operation. However, when it has been that paper has been loaded in the printing position, the CPU proceeds to step 52, thereby performing its operation. At the step 54, CPU 22 moves the cartridge to a position in which the cartridge can be easily detached and attached by the user, and exchanged. Thereafter, all the operations are ended.

At the step 52, the CPU 22 releases the "no paper" error indication and then ends all the operations.

Figure 5:
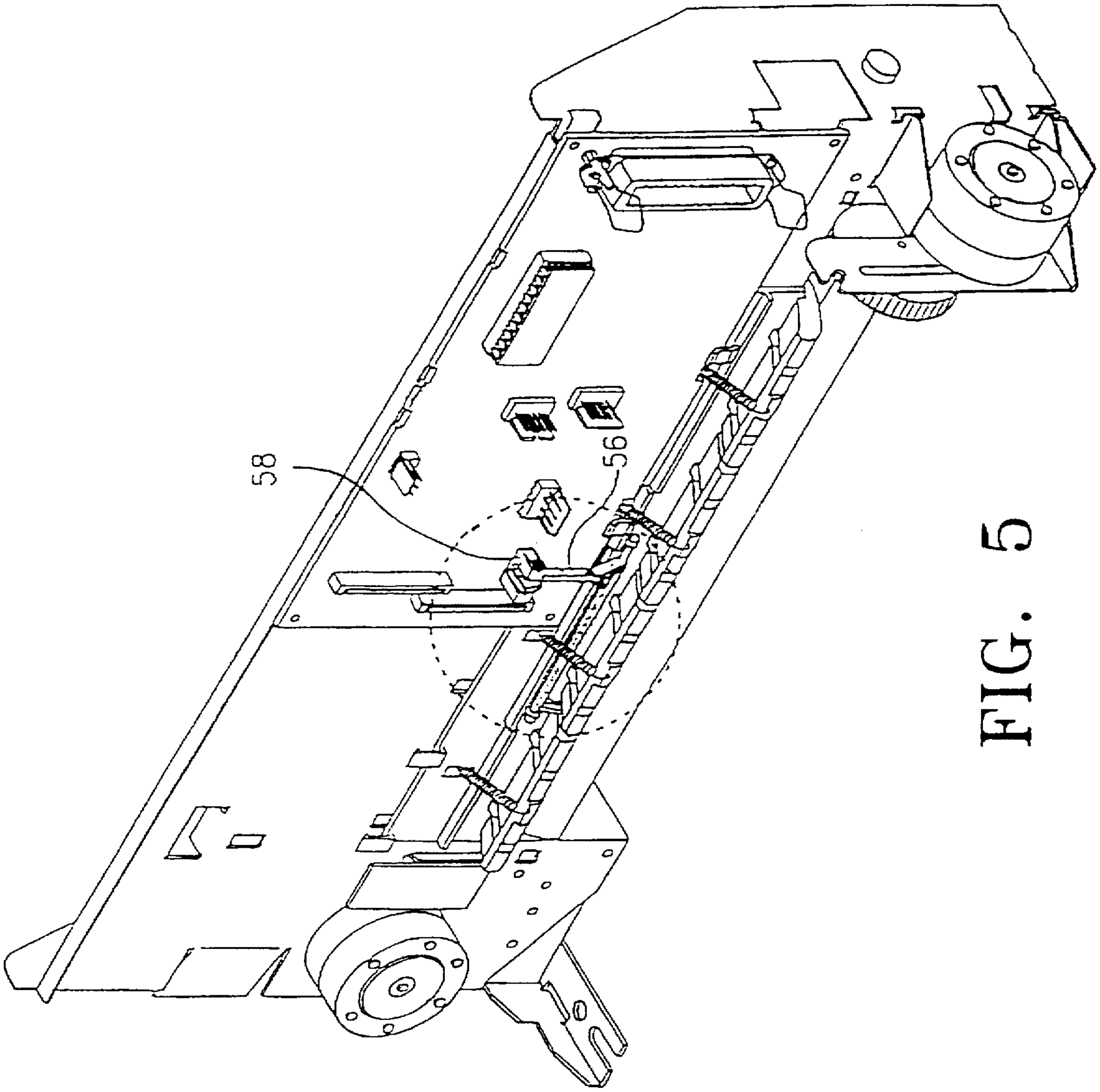
FIGS. 5 and 6 illustrate the state of operation of a paper sensor.
Figure 6:
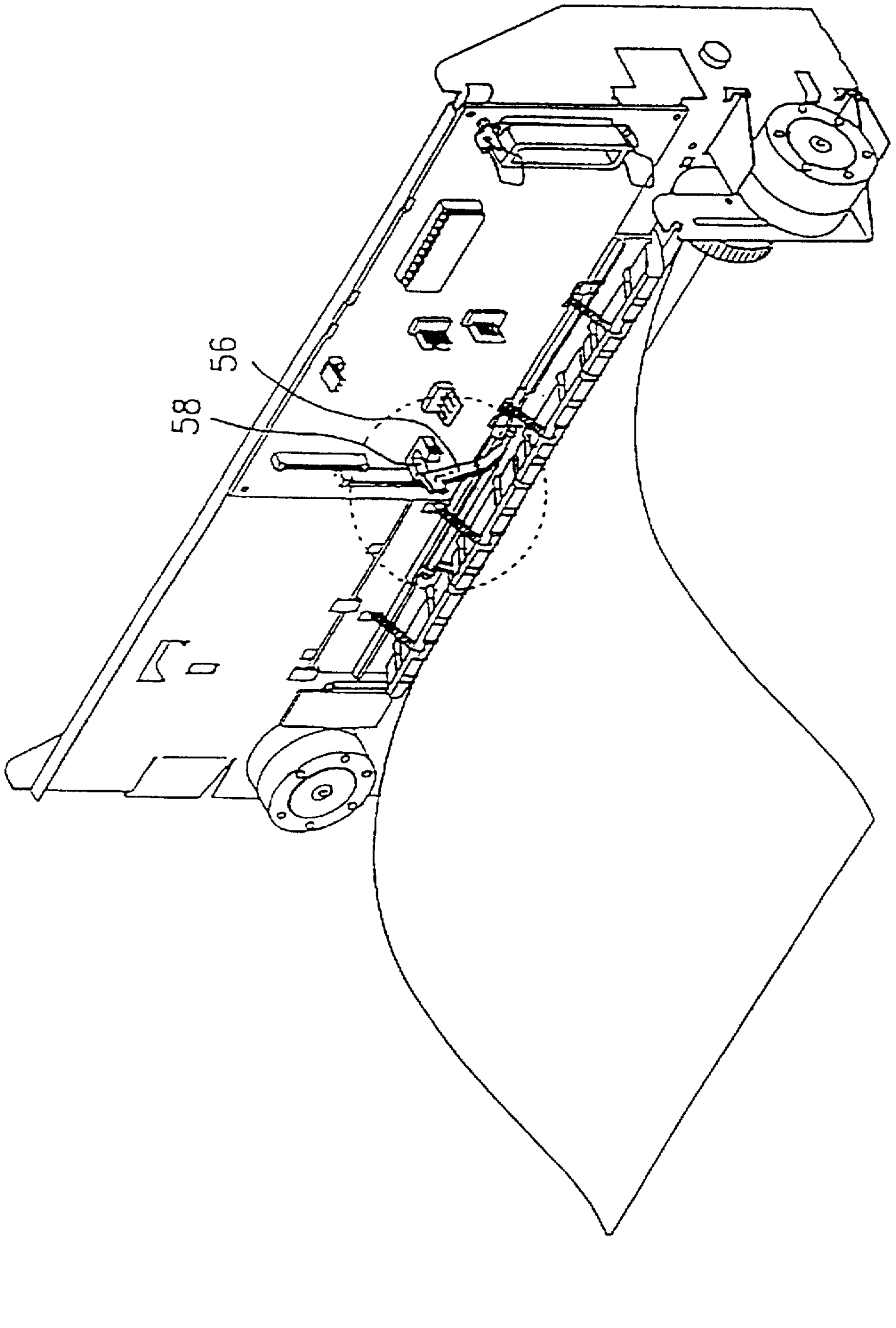

Hereinafter, there will be described in detail with reference to FIGS. 5 and 6 illustrating the state of operation of a paper sensor by sensing whether or not there are papers at the printing position of the ink-jet printer by the paper sensor. The paper sensor is installed on the substrate of a main circuit. Further, it is comprised of an optical sensor 58 including a light receiving unit and a light emitting unit; an actuator feed 60 for inserting one side thereof into the optical sensor 58 in the absence of paper, and for being detached from the optical sensor 58 in the presence of paper; and a spring (not shown) coupled to the actuator feed 60.

As illustrated in FIG. 5, one side of the actuator feed is inserted into the optical sensor 58 when paper is not loaded in the printing position of the ink-jet printer. Therefore, the light receiving unit can not receive the light generated by the light emitting unit of the optical sensor 58.

As illustrated in FIG. 6, one side of the actuator feed 60 is detached from the optical sensor 58 when the paper is loaded in the printing position of the ink-jet printer. Therefore, the light receiving unit can receive the light generated by the light emitting unit of the optical sensor 58.

The output of the light receiving unit can be changed according to whether or not the light is received. Thus, the CPU 22 recognizes that state as "no paper" when the light receiving unit does not receive the light. When the light receiving unit receives the light, the CPU 22 recognizes that state as "paper loaded".

Hereinafter, there will be detailed explanation in regard to the operation of a key for the form feed and the cartridge exchange according to an embodiment of the present invention as described in the above.

When a user would like to eject the paper which has been inserted in the printing position within the ink-jet printer and to operation the cartridge exchange/form feed key 42, the operation thereof is as follows. The CPU 22 senses that paper is loaded in the printing position within the ink-jet printer, and then ejects the paper.

Also, when a user operates the cartridge exchange/form feed key 42 in order to perform the form feed after inserting paper from the paper tray, in case of generating the error "no paper" while using the ink-jet printer, the operation thereof is as follows. The CPU 22 senses the above state and then drives the LF motor so as to load the paper from the paper tray to the earliest printing position. Thus, a paper feed roller is driven and then, the inserted paper is loaded in the earliest printing position. After loading the paper, the CPU 22 checks whether or not there is paper in the printing position. Since the paper is loaded according to the above manner, there should be paper in the printing position. Thus, the CPU 22 senses that paper is loaded in the printing position and then releases the error indication "no paper".

Further, when a user would like to exchange an old cartridge with a new cartridge, the operation thereof is as follows. Firstly, a user ejects the paper and then operates the cartridge exchange/form feed key 42 when paper is loaded in the printing position within the ink-jet printer. The user removes the paper from the paper tray and then operates the cartridge exchange/form feed key 42.

The CPU 22 checks whether or not there is paper in the printing position. When there is no paper, the CPU 22 drives the LF motor in order to load the paper from the paper tray to the earliest printing position. Thus, the paper feed roller is driven. After driving the LF motor, the CPU 22 checks whether or not paper is loaded in the printing position. Since there is no paper in the paper tray, there is no paper loaded. For that reason, paper is not loaded in the printing position, accordingly. The CPU 22 then moves the cartridge to a position when it can be easily detached and attached, and easily exchanged by a user.

As described in the above, the present invention can input many kinds of commands thereto by using one key for using for the form feed and the cartridge exchange. Thus, the present invention has an advantage in that the key input unit can be simplified in the ink-jet printer capable of be controlled by the host using a DOS operating system.

While the present invention has been described with reference to a specific embodiments, the description is illustrative of the invention and is not to be constructed as limiting the invention. Various modifications may occur to those skilled in the art without departing from the true spirit and scope of the invention as defined by the appended claims.

What is claimed is:

1. A method for using one key for both form feed and cartridge exchange in the ink-jet printer, comprising the steps of:

(a) receiving key data generated by inputting a unitary cartridge exchange form feed key;

(b) checking whether or not paper is located at the printing position of said ink-jet printer after receiving said key data;

(c) ejecting paper from the printing position upon a determination that paper is located therein in step (b);

(d) moving paper from a paper tray to an earliest printing position upon a determination that paper is absent therein in step (b);

(e) checking once again whether or not paper is located at the printing position of said ink-jet printer after moving paper in step (d); and (f) moving said cartridge to a position in which it can be easily detached and attached upon a determination that paper is absent in step(e).

2. The method as claimed in claim 1, step (e) further comprising the step of releasing an error indication "no paper" upon a determination of paper being located at the printing position.

3. An apparatus for using one key for both form feed and cartridge exchange in the ink-jet printer, comprising:

(a) a means for receiving key data generated by inputting a unitary cartridge exchange/form feed key;

(b) a means for checking whether or not paper is located at the printing position of said ink-jet printer after receiving said key data;

(c) a means for ejecting paper from the printing position upon a determination that paper is located therein by the checking means;

(d) a means for moving paper from a paper tray to an earliest printing position upon a determination that paper is absent therein by the checking means;

(e) the checking means for checking once again whether or not paper is located at the printing position of said ink-jet printer after the paper is moved by the means for moving paper; and (f) a means for moving said cartridge to a position in which it can be easily detached and attached upon a determination that paper is absent by the checking means.

4. The apparatus as claimed in claim 3, further comprising a means for releasing an error indication "no paper" upon a determination of paper being located at the printing position by the checking means after paper is moved by the moving means.

* * * * *